M. W. LEONHARDT.
MACHINE FOR HULLING OATS OR COTTON SEED.
No. 11,200. Reissued Nov. 3, 1891.
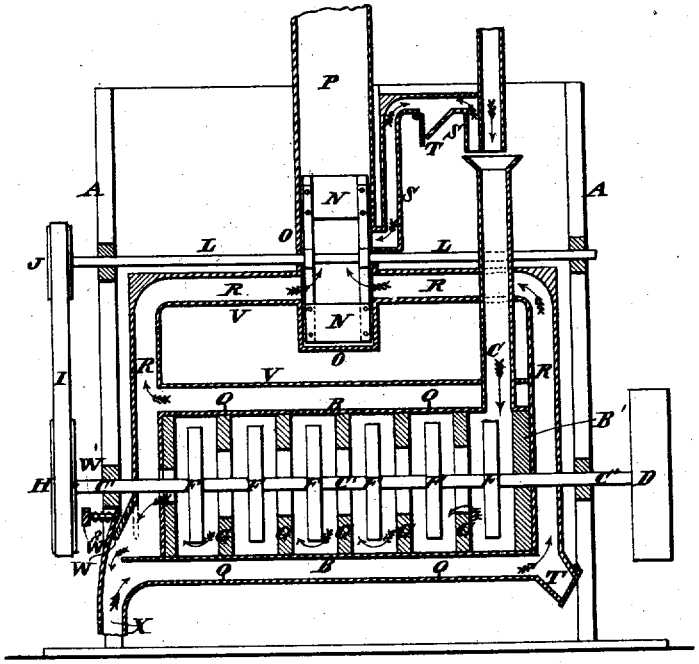
Attest;
E. Arthur
M. E. Durand.
Inventor;
M. W. Leonhardt
By Wright Bros
Atty's
THE NORRIS PETERS CO., PHOTO-LITHO., WASHINGTON, D. C.

UNITED STATES PATENT OFFICE.

MARTIN WILLIAM LEONHARDT, OF ST. LOUIS, MISSOURI, ASSIGNOR OF ONE-HALF TO GEORGE J. FRITZ, OF SAME PLACE.

MACHINE FOR HULLING OATS OR COTTON-SEED.

SPECIFICATION forming part of Reissued Letters Patent No. 11,200, dated November 3, 1891.

Original No. 425,331, dated April 8, 1890. Application for reissue filed June 24, 1890. Serial No. 356,587. (No model.)

*To all whom it may concern:*

Be it known that I, MARTIN WILLIAM LEONHARDT, of the city of St. Louis, in the State of Missouri, have invented a certain new and useful Improvement in Machines for Hulling Oats or Cotton-Seed, of which the following is a full, clear, and exact description, reference being had to the accompanying drawing, forming part of this specification.

My invention relates to machines for hulling oats or cotton-seed; and it consists in the combination and arrangement of parts, which will be more fully described hereinafter, and particularly pointed out in the claims.

The drawing represents a vertical section of a machine embodying my invention.

A represents a suitable inclosing case or frame, in the lower portion of which is placed a horizontal cylinder B, into which the seeds are discharged at one end through the conductor C. Passing horizontally through the frame A and the cylinder B is the driving-shaft C′, provided with the driving-pulley D upon one end, and to which, inside of the cylinder, is secured the vertically-revolving emery plates or disks F, or of any suitable material or construction that may be preferred.

Secured to the inner sides of the cylinder B, which is made of sheet-steel or any other suitable material, are the stationary emery disks or plates G, which have openings formed through their centers of sufficient size to permit the shaft C′ and the grain which is being hulled to pass freely through toward the opposite end of the cylinder, from which they were admitted through the conductor C. These emery-disks F G are placed in the cylinder at a suitable distance apart, and when the shaft C′ is made to revolve the revolving disks F force the grain from the delivery end of the cylinder to the discharge end, the hulls being torn or broken off the seed between the revolving and stationary disks, which are provided with roughened surfaces of any suitable construction for the purpose of breaking or rubbing off the hulls of the seed by frictional contact.

As the seeds fall from the conductor C they pass in between the first disk F and the head B′ of the cylinder, and if any of them, as would probably be the case, fall upon the first disk F, they are carried by the movement of the disk in a downward direction to the lower part of the cylinder. As the shaft C′ revolves the seeds are first packed between the first disk F and the first disk G and head B′ of the cylinder until they are finally carried over through the central opening of the first disk G into the space between the first and second disks G, where they are acted upon by the second disk F. This arrangement of the disks, whereby the seeds have to be elevated through the weight of the seeds behind them, so as to pass through the eye of the next stationary disk, causes the seeds to be firmly packed in between each two of the stationary disks, and this effects a severe action upon the seeds between the moving and fixed disks, which thoroughly removes the hulls from the kernels, and this action is further effected by means of an automatic resisting-valve W. The normal position of the valve W is that shown in dotted lines in the drawing. As the seeds issue from the cylinder they pack up against the automatic resisting-valve W and gradually force it open. The action of the valve is to retard the free passage of the seeds through the cylinder, so that they will be more compact therein and more effectually rubbed between the moving and fixed disks. When the pressure on the seeds becomes sufficiently great, the valve W is opened, so as to permit the seeds to fall through the delivery-spout X.

No adjustment of any of the parts is necessary, for by placing the disks at a suitable distance apart and providing the valve W the hulls of all the seed are torn or rubbed away before the seeds have passed through the cylinder.

Placed upon the opposite end of the shaft C′ from the pulley D is a pulley H, from which passes a belt I up over the pulley J upon the fan-shaft L. Secured to this shaft L is a fan N, which is placed in a suitable casing O, and from which casing extends the discharge-pipe P. Extending around the cylinder B are the flues or chamber Q, and from these flues or chamber Q extend the end flues R, which connect at their upper ends with the fan-casing O, which is placed at the center of the frame A above the cylinder B.

By so constructing the machine that the surrounding chamber communicates with the spout or exit-passage both below and above an advantage arises owing to the fact that the matter is completely withdrawn without interfering with the direct passage of the cleaned material. The suction of the fan N is connected with the exit-passage above and below the cylinder through the flues Q R, so as to draw away all of the broken hulls, dust, and dirt from the grain, and the fan drives off this lighter material through the pipe P.

A closed casing V is supported in the frame A above the cylinder B and separated therefrom by the chamber Q, the purpose of which is to entirely close the inner space of the frame A, with the exception of the flues R, whereby a stronger suction from the fan N is exerted upon the material as it passes from the cylinder than would be if the space which is occupied by the casing V were left vacant. The object of placing the fan above the cylinder and upon a separate shaft is to make the machine compact in form, to place it where the suction will be evenly distributed throughout the machine, to place it near the outer end of the inlet-pipe, whereby the inflowing grain would be subjected to a strong current through the medium of a short flue, and to provide a separate shaft for the fan, whereby it is driven at a higher speed than the shaft C′, which is very essential in order to provide sufficient suction for the threefold operation upon the material, as before described. Also connected with the fan N is a flue S, which has its upper end to approach within any desired distance of the upper end of or an opening in the conductor C, so as to draw away the dust, dirt, and lighter portions of the grain, and thus prevent it from passing down into the cylinder. The upper end of the conductor is flared outward, as shown, and the upper end of the flue S is preferably made to extend in a line with the conductor and its end to be over the flared portion thereof, so that a suction is not caused upon the material at the upper end only of the conductor; but by reason of the end of the pipe S extending in a line therewith a suction is caused upon the material to a considerable distance down the conductor C, thus removing more thoroughly the dust and chaff from the material before it enters the cylinder than would be the case if the end of the pipe extended at an angle to the conductor.

Connected with the flues Q and S are suitable traps T, in which a portion of the dust and dirt is caught and from which it can be discharged at any time.

If so desired, the parts here shown and described may be arranged vertically instead of horizontally; but the horizontal position shown and described is preferred. Owing to the shape and arrangement of the disks F G and the automatic spring-valve W, which regulates the escape of the grain, the grain is held in the cylinder sufficiently long to have the hull or covering of every seed broken or torn away, so that when the seed does escape from the cylinder it will be thoroughly hulled.

None of the parts of this machine being adjustable, but all being rigidly secured in position, none of the parts are liable to get out of order.

I am aware of patent to J. S. Poultney, November 26, 1872, and others having fixed disks with central openings and interposed by movable disks; but I am not aware of any device or machine having the advantages of my fixed disks with central openings and straight sides when interposed by movable disks with straight sides, whereby the passage of the stuff through the machine is retarded and thoroughly acted upon and the hulls carried off by means of a fan.

I claim as my invention—

1. In a seed-hulling machine, the combination of a conducting-tube, a cylinder with which said conducting-tube communicates, a number of fixed disks or plates with straight sides secured within said cylinder and having enlarged openings at their centers, a shaft passing through the cylinder and fixed disks, a series of movable disks with straight sides secured to said shaft, means for turning the shaft, a surrounding chamber communicating with the passage from the cylinder both below and above, a fan, and end air-flues forming a communication between said fan and the cylinder surrounding chamber, substantially as and for the purposes set forth.

2. In a seed-hulling machine, the combination of a conducting-tube, a hulling-cylinder with which said conducting-tube communicates and having a suitable discharge-opening, a chamber surrounding the hulling-cylinder and communicating both below and above with said discharge-opening, a fan, and flues communicating between the ends of said surrounding chamber and said fan, all substantially as and for the purposes set forth.

3. In a seed-hulling machine, the combination of a conducting-tube, a cylinder with which said tube communicates, a series of fixed disks located within said conducting-tube and having enlarged central openings, a shaft passing through said cylinder, a series of movable disks secured to said shaft and interposed between said fixed disks, means for turning the shaft, a surrounding chamber communicating below and above the delivery-spout of said cylinder, a fan, and end flues forming a communication between said surrounding chamber and fan, substantially as and for the purposes set forth.

4. In a seed-hulling machine, the combination of the conducting-tube, the hulling-cylinder communicating above and with said conducting-tube and having a suitable discharge-opening at the other end, the surrounding chamber communicating below and above with said discharge-opening, the fan, the end flues making communication between the surrounding chamber and the fan, and a communication between said fan and the supply-tube, all substantially as and for the purposes set forth.

5. In a seed-hulling machine, the combination, with the outer casing, of a hulling-cylinder of less length than the said casing and supported above the bottom of the casing, whereby end and bottom flues are formed, the said bottom flue connecting with the outlet below one end of the cylinder, the closed inner casing of less length than the outer casing and supported a suitable distance above the cylinder and below the top of the said casing, whereby top flues are formed which connect with the said end flues, the suction outlet-pipe, the inner casing provided with a depression below the said outlet and which connects with the top flue, the fan placed within the depression and the outlet, and an inlet and outlet to the hulling-cylinder, substantially as shown and described.

MARTIN WILLIAM LEONHARDT.

In presence of—
THOS. KNIGHT,
E. S. KNIGHT.